Figure 1:
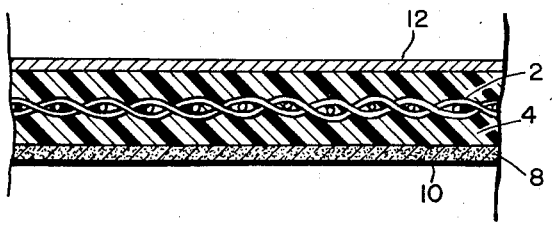

Sept. 23, 1958  S. A. CORREN  2,853,537
SHEET ELECTROLYTE FOR BATTERIES
Filed Nov. 30, 1956

INVENTOR.
SIDNEY A. CORREN
BY
*Leonard H. King*
AGENT

2,853,537
Patented Sept. 23, 1958

2,853,537
SHEET ELECTROLYTE FOR BATTERIES

Sidney A. Corren, Katonah, N. Y.

Application November 30, 1956, Serial No. 625,363

4 Claims. (Cl. 136—145)

This invention relates to sheet electrolyte for electrochemical cells.

In the copending application of Arnold S. Louis, Serial Number 625,634 entitled "Miniature Moldable Battery" and assigned to the assignee of the present invention there is disclosed an electrochemical cell having the entire system encapsulated in a plastic container. To facilitate the encapsulation and molding of the particular cells, disclosed in the referenced patent application, and for the manufacture of batteries in general, it would be useful to have electrolyte in sheet form which could be easily fabricated by machine methods, such as die punching, which will withstand the rigors of a molding operation and which will be sufficiently dry so as not to express electrolyte during molding.

Accordingly, it is an object of this invention to provide an improved electrolyte for electrochemical cells.

It is another object to provide a sheet electrolyte for electrochemical cells.

It is still another object to provide a sheet electrolyte which may be die cut.

Still a different object is to provide a sheet electrolyte of high liquid retention properties.

A further object is to provide a sheet electrolyte which may be readily sealed into a molded electrochemical cell.

Still other objects and advantages will be pointed out with particularity and still others will become apparent as the following description, taken in conjunction with the accompanying drawing, proceeds.

In the drawing there is shown in cross-section an electrolyte sheet of this invention.

Referring to the drawing there is shown a woven fiber glass mat 2, impregnated with insolubilized polyvinyl alcohol 4 which has absorbed therein an electrolyte. Applied to one side of the impregnated mat is a polyvinyl alcohol-graphite suspension 8 which provides a good electrical contact to the carbon anode 10. Zinc electrode 12 completes the cell. The cell may be packaged in any number of the suitable containers known to the art including the battery cell disclosed in the referenced patent application of Arnold S. Louis and the cell disclosed in H. A. Gottschall Patent Number 2,684,397.

For a more complete understanding of the invention there is provided the following detailed example:

*Example 1.*—Electrolyte sheeting was made using the following materials:

I. Fiber glass cloth 0.003" thickness Hess-Goldsmith & Co., No. 112.
II. Polyvinyl alcohol, E. I. du Pont de Nemours
    & Co., "Elvanol" 72–60 _____parts__ 100
    Dimethylol urea _____do___ 10
    Ammonium chloride _____do___ 1
    Water _____do___ 1500
III. Polyvinyl alcohol E. I. du Pont de Nemours
    & Co., "Elvanol" 70–05 _____parts__ 10
    Graphite (Dixon grade 200–10) _____do___ 100
    Water _____do___ 500
IV. Water _____do___ 50
    Ammonium chloride _____do___ 1

Two sheets of fiber glass (I) approximately 2' x 3' are washed in dilute nitric acid and then thoroughly rinsed. The two sheets are then stretched over a heated frame. The fiber glass is dried whereupon the polyvinyl alcohol solution II is evenly applied to the fiber glass lay-up.

Upon the completion of each coat, the lay-up is heated to approximately 150° F. and each successive layer is dried. About three coats on the fiber glass accomplish thorough impregnation with polyvinyl alcohol. Following the impregnation, each side of the lay-up is given a brush coat of the polyvinyl alcohol solution to bring the thickness of the coated glass cloth to 0.009" ± 0.001". A final coating of a graphite-polyvinyl alcohol dispersion (III) is applied to one side to provide a good contact to the cathode. The finished sheet is heated at 250° F. for one hour to dry said dispersion. The sheet is then cut into pieces of suitable size for use in the electrochemical cell.

Prior to use in the cell the coated glass fiber sheet is soaked for at least 24 hours in the electrolyte (IV). The electrolyte sheet is pressed to remove excess electrolyte just prior to use and in this form can be readily die cut to any desired shape.

The electrolyte sheet is then incorporated in a cell as described in the above referenced copending application of Arnold S. Louis.

It should be noted that while I have disclosed but one electrolyte other electrolytes not reactive with the polyvinyl alcohol may be employed in keeping with the particular electrochemical system involved.

While the preferred porous support member is fiber glass cloth, it is within the scope of this invention to employ rayon, nylon, Dacron, Orlon, saran, or other woven cloths, filter paper or the like. The particular porous support member chosen should be consistent with the chemical properties of the electrolyte, that is to say the electrolyte and mat material should not be chemically reactive.

*Example 2.*—The process of Example 1 is repeated using saran cloth in place of the glass fiber.

*Example 3.*—The process of Example 1 is repeated using nylon cloth in place of the glass fiber.

*Example 4.*—The process of Example 1 is repeated using rayon cloth in place of the glass fiber.

*Example 5.*—The process of Example 1 is repeated using Orlon in place of the glass fiber.

Thus while in accordance with the statutes I have disclosed the best mode presently contemplated for carrying out the invention it is to be understood that various modifications may be made without departing from the spirit of the invention and that accordingly I wish to be limited only by the scope of the appended claims.

What is claimed is:

1. A die cuttable electrolyte sheet structure, containing immobilized electrolyte, adapted for insertion between the positive and negative electrodes of an electrochemical cell to provide a cell reaction and ion diffusion medium between said electrodes in the absence of mobile electrolyte comprising a polyvinyl alcohol sheet, a woven fiber reinforcing member encapsulated in said polyvinyl alcohol sheet, and a liquid electrolyte impregnated in the said polyvinyl alcohol sheet, wherein said fiber is selected from the group consisting of glass and polymeric synthetic resin fibers mutually non-soluble and non-reactive with said electrolyte and said polyvinyl alcohol.

2. The structure of claim 1 wherein said selected fiber is glass.

3. The structure of claim 1 wherein said selected fiber is a polymeric synthetic resin.

4. The structure of claim 1 wherein there is provided on at least one face of said polyvinyl alcohol sheet, a layer of polyvinyl alcohol having dispersed therein carbon particles and being impregnated with said electrolyte.

References Cited in the file of this patent

UNITED STATES PATENTS

| | | |
|---|---|---|
| 1,942,668 | Smith | Jan. 9, 1934 |
| 2,399,127 | Lipinski | Apr. 23, 1946 |
| 2,487,985 | Ruben | Nov. 15, 1949 |
| 2,566,114 | Bloch | Aug. 28, 1951 |
| 2,635,127 | Yardney et al. | Apr. 14, 1953 |